United States Patent
Ransom et al.

(10) Patent No.: US 7,644,290 B2
(45) Date of Patent: Jan. 5, 2010

(54) SYSTEM AND METHOD FOR SEAL TAMPER DETECTION FOR INTELLIGENT ELECTRONIC DEVICES

(75) Inventors: Douglas S. Ransom, Victoria (CA); Hal E. Etheridge, Brentwood Bay (CA); Stewart J. Harding, Victoria (CA); Markus F. Hirschbold, Victoria (CA); Theresa M. Köster, Victoria (CA); Simon H. Lightbody, Victoria (CA)

(73) Assignee: Power Measurement Ltd., Saanichton British Columbia (CA)

( * ) Notice: Subject to any disclaimer, the term of this patent is extended or adjusted under 35 U.S.C. 154(b) by 642 days.

(21) Appl. No.: 10/813,369

(22) Filed: Mar. 30, 2004

(65) Prior Publication Data
US 2005/0039040 A1    Feb. 17, 2005

Related U.S. Application Data

(60) Provisional application No. 60/459,182, filed on Mar. 31, 2003, provisional application No. 60/459,152, filed on Mar. 31, 2003.

(51) Int. Cl.
| | |
|---|---|
| G06F 11/30 | (2006.01) |
| G06F 12/14 | (2006.01) |
| G06F 7/04 | (2006.01) |
| G06F 17/30 | (2006.01) |
| H04L 9/32 | (2006.01) |
| H04N 7/16 | (2006.01) |
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |
| G06Q 20/00 | (2006.01) |
| G08B 13/14 | (2006.01) |

(52) U.S. Cl. .......................... 713/194; 713/193; 726/2; 726/26; 726/34; 705/63; 340/541; 340/568.1

(58) Field of Classification Search ............... 713/194, 713/189, 193; 726/2, 16, 26, 27, 34–36; 380/59; 705/63; 340/500, 540–542, 545.1–545.9, 340/547–552, 555–557, 561–567, 568.1–568.3, 340/568.4, 568.8

See application file for complete search history.

(56) References Cited

U.S. PATENT DOCUMENTS 4,804,957 A * 2/1989 Selph et al. ............ 340/870.03

(Continued)

FOREIGN PATENT DOCUMENTS

WO    WO 00/42731    7/2000

(Continued)

OTHER PUBLICATIONS

OMRMX product specifications, Landis+Gyr, Lafayette,IN, document dateDec. 5, 2003, 2 pages.

(Continued)

*Primary Examiner*—Nasser G Moazzami
*Assistant Examiner*—Oscar A. Louie
(74) *Attorney, Agent, or Firm*—Brinks Hofer Gilson & Lione

(57) ABSTRACT

A system and method for detecting and responding to device tampering in an Energy Management ("EM") device is disclosed. The EM device is provided with mechanisms to detect and indicate unauthorized tampering with the device. Further, in response to detected unauthorized tampering, the device may take actions to protect the integrity of data generated by the device as well as protect any confidential data stored within the device. Such actions may include preventing further device operation, generating warnings to the device owner/user, marking subsequently generated data as suspect, destroying stored confidential data, etc.

38 Claims, 5 Drawing Sheets

U.S. PATENT DOCUMENTS

| | | | |
|---|---|---|---|
| 5,719,564 A * | 2/1998 | Sears | 340/870.02 |
| 5,978,475 A * | 11/1999 | Schneier et al. | 713/177 |
| 6,061,451 A | 5/2000 | Muratani et al. | |
| 6,118,269 A * | 9/2000 | Davis | 324/110 |
| 6,157,721 A * | 12/2000 | Shear et al. | 380/255 |
| 6,233,685 B1 * | 5/2001 | Smith et al. | 713/194 |
| 6,515,574 B1 * | 2/2003 | Herbert et al. | 340/5.3 |
| 6,801,865 B2 * | 10/2004 | Gilgenbach et al. | 702/61 |
| 7,007,171 B1 * | 2/2006 | Butturini et al. | 713/194 |
| 2002/0002683 A1 * | 1/2002 | Benson et al. | 713/194 |
| 2003/0081790 A1 | 5/2003 | Kallahalla et al. | |
| 2003/0110302 A1 | 6/2003 | Hodges et al. | |

FOREIGN PATENT DOCUMENTS

| | | |
|---|---|---|
| WO | WO 01/33801 A2 | 5/2001 |
| WO | WO 03/107153 A2 | 12/2003 |
| WO | WO 03/107296 A2 | 12/2003 |
| WO | WO 03/107585 A1 | 12/2003 |
| WO | WO 2004/017077 A1 | 2/2004 |

OTHER PUBLICATIONS

Ramar® TransPodIT® product specifications, Ramar, Research Triangle Park, NC, document date Sep. 12, 2002, 2 pages.

Rolf Carlson, Sandia National Laboratories, *Sandia SCADA Program High-Security SCADA LDRD Final Report*, Apr. 2002.

QUAD4® Plus/MAXsys™ *Products User's Guide*, Chapter 1 Overview (2 pages).

"AIN Alpha, High Function Multi-Tariff Solid State Electricity Meter," *ABB Network Partner*, PB 42-280-lb, pp. 1-20.

"Powerlogic® Series 4000 Circuit Monitor," Square D/Schneider Electric, Bulletin No. 3020HO0001, Apr. 2000 (6 pages).

* cited by examiner

SYSTEM AND METHOD FOR SEAL TAMPER DETECTION FOR INTELLIGENT ELECTRONIC DEVICES

RELATED APPLICATIONS

This application claims the benefit of the filing date under 35 U.S.C. § 119(e) of U.S. Provisional Application Ser. No. 60/459,182, "TECHNIQUES FOR SECURING ENERGY MANAGEMENT SYSTEMS" filed Mar. 31, 2003, which is hereby incorporated by reference, and U.S. Provisional Application Ser. No. 60/459,152, "ACCESS CONTROL FOR ENERGY MANAGEMENT COMPONENTS" filed Mar. 31, 2003, which is hereby incorporated by reference.

The following co-pending and commonly assigned U.S. patent application relates to and further describes other aspects of the embodiments disclosed in the present application and is herein incorporated by reference: U.S. patent application Ser. No. 10/752,467, "SYSTEM AND METHOD FOR SECURING ENERGY MANAGEMENT SYSTEMS", filed Jan. 5, 2004.

BACKGROUND

Energy Management ("EM") data includes, but is not limited to, Electrical Operation Data such as volts, amps, status, power; Power Quality Data such as harmonics, power factor, reliability (such as number of nines), disturbance data; Consumption Data such as energy and demand; Event Data such as set point actions, status changes and error messages; Financial Data such as energy cost, power factor penalties, revenue data; billing data such as tariffs for gas, water, steam and air; Environmental Data such as temperature, pressure, humidity, pollution, and lightning/atmospheric disturbance data; Water Air Gas Electric Steam ("WAGES") data; Configuration data such as frameworks, firmware, software, calculations involving EM Data and commands; and aggregated data, where at least one energy management datum is combined with other data points. Combined data includes measured data, aggregated data and/or computed data.

An EM component is an entity that creates, consumes or routes EM data. These components include but are not limited to: Intelligent Electronic Devices ("IEDs") (also known as EM Devices), digital sensors as described in U.S. Pat. No. 6,236,949, gateways, and computers.

IEDs include revenue electric watt-hour meters, protection relays, programmable logic controllers, remote terminal units ("RTUs"), fault recorders, other devices used to monitor and/or control electrical power distribution and consumption, RTUs that measure water data, RTUs that measure air data, RTUs that measure gas data, and RTUs that measure steam data. IEDs are widely available that make use of memory and microprocessors to provide increased versatility and additional functionality. Such functionality includes the ability to communicate with other hosts and remote computing systems through some form of communication channel. IEDs also include legacy mechanical or electromechanical devices that have been retrofitted with appropriate hardware and/or software allowing integration with the power management system. Typically an IED is associated with a particular load or set of loads that are drawing electrical power from the power distribution system. The IED may also be capable of receiving data from or controlling its associated load. Depending on the type of IED and the type of load it may be associated with, the IED implements a function that is able to respond to a command and/or generate data. Functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof. For functions that produce data or other results, the IED can push the data onto the network to another IED or back end server/database, automatically or driven by events, or the IED can send data in response to an unsolicited request. IEDs capable of running Internet protocols may be known as "web meters". For example, a web meter may contain a web server.

For the purposes of the present disclosure, a computer is defined as a device that comprises a processing unit and includes, but is not limited to, personal computers, terminals, network appliances, hand-held device that reads data from EM devices, Personal Digital Assistants ("PDAs"), wired and wireless devices, tablet personal computers, mainframes, as well as combinations thereof.

A framework is a set of interconnected functions that are uploadable to a device and that affect the behavior of the device. A framework can be produced from scripting languages like PERL, VBScript and XSLT, predicate logic like Prolog, fuzzy logic and functional programming, spreadsheets like Visicalc and Excel, user interface definitions such as XSLT and XFORMS, and downloadable software that is interpreted, just-in-time compiled or compiled. Alternately, frameworks may be created and manipulated by connecting multiple integrated object network ("ION®") modules together. ION® defines the way information, specifically power monitoring information, is accessed, transferred and manipulated inside an EM Device. The functionality and data manipulation of the EM Device can be accomplished by one or several frameworks stored in the IED software. A complete list of ION® modules is contained in the "ION® Reference Manual", printed by Power Measurement Ltd., located in Saanichton, B.C., Canada.

One or more EM components may be coupled together in arbitrary configurations to form EM networks.

EM systems are formed by coupling one or more EM Networks together. When there is more than one EM network within the system, the networks can be linked in any functional way. Not all networks within a system are required to be directly coupled with one another, and EM networks may be coupled with one another via a third EM network or some other intermediary. Non-EM networks may also couple EM networks with one another.

These EM networks or EM systems represent many entities, including Device Manufacturers, Utilities, Power Consumers, End Users, National Accounts Customers, Load Serving Entities ("LSEs"), Application Service Providers ("ASPs"), Independent Service Operators ("ISOs"), Non Affiliated Entities ("NAEs"), customer sites running device configuration utilities, Meter Shops, and Third Party Data Sources providing energy related data such as weather, tariffs and so forth.

LSEs are entities authorized to supply energy to retail customers.

ASPs are typically entities that supply software application and/or software related services over the Internet.

ISOs are entities that were formed to distribute electricity to the grid after deregulation.

NAEs are groups of entities that may share some information with each other but are not closely related. For example, utilities, energy marketers, ISOs and other entities all need to exchange EM data with one another as part of their business, but don't necessarily trust each other or share the same private network.

An exemplary device configuration utility is ION® Designer, manufactured by Power Measurement Ltd, of Saanichton, B.C. Canada.

Meter Shops are plants or industrial units where IEDs are configured.

Some EM components may host Energy Management Software ("EM Software") systems that allow users to manage associated EM components, networks and/or systems. An exemplary EM Software package is ION® Enterprise, manufactured by Power Measurement Ltd, of Saanichton, B.C. Canada. For the purposes of this application, a user is considered to be either a person or a component that interacts with, extracts data and provides commands and data to an EM component, EM network, or EM system.

EM components within the same network communicate with one another via channels. Components in different networks communicate with one another as well, possibly using different channels. A channel is essentially the infrastructure used to move data from one place to another, and can include public or third-party operated networks such as: Virtual Private Networks ("VPNs"), Local Area Networks ("LANs"), Wide Area Networks ("WANs"), telephone, dedicated phone lines (such as ISDN or DSL), Internet, Ethernet, paging networks, leased line; wireless including radio, light-based or sound-based; Power Line Carrier schemes; data transported by couriers, postal services or meter readers driving around in vehicles, where the data is stored in some format such as printed, magnetic, optical, flash memory, RAM, on a computer, Personal Digital Assistant ("PDA"), Hand-Held Format ("HHF") reader or other device.

VPNs connect disjoint parts of the same network. They also allow authenticated users to communicate securely over the Internet with a protected or private network. VPNs work by allowing client devices to securely communicate with a VPN concentrator or server. The client or concentrator may be embedded in another device such as a firewall or a router. This is particularly valuable when users are separated by geographic distance that otherwise limits their access to the protected or private network.

Power Line Carrier describes a family of networking technologies that enable computer and voice networking over existing electrical wiring.

Various protocols that may be used in the EM System include but are not limited to: TCP/IP, Bluetooth, Ethernet, IEEE 802.11a, IEEE 802.11b and IEEE 802.11g, HTTP, SMTP, NNTP, POP, IMAP, IPSec, Trivial File Transfer Protocol ("TFTP"), Blocks Extensible Exchange Protocol ("BEEP"), Zigbee, MIME, SNMP, SOAP, and XML-RPC.

Many different data formats that may be used to exchange data, including but not limited to: binary, XML, XHTML and XHTML Basic, XHTML Basic as an Infoset in another form besides tagged text, Binary encoded equivalents of XML Infosets including Wireless Binary XML ("WBXML"), ASN.1 encoded XML, Scalable Vector Graphics ("SVG"), Direct Internet Message Encapsulation ("DIME"), Comma Separated Values ("CSV"), XML Remote Procedure Call ("XML RPC"), Simple Object Access Protocol ("SOAP") (with signature at SOAP level and/or enclosed content level), SOAP (using WS-SECURITY with signature at SOAP level and/or enclosed content level), application specific content like spreadsheet data, an HTTP response to an unsolicited HTTP request, a response to an unsolicited message, HHF, PQDIF, MODBUS, ION®, or other SCADA protocol where a response can be packaged up and embedded in another protocol or format. These formats are frequently sent as MIME or UUENCODE attachments and are considered part of the protocol stack.

Most channels between components in an EM System are insecure channels subject to security attacks including malicious acts such as forgery, denial of service, invasion of privacy and so forth. Messages passed over insecure channels are subject to interception, tampering and fraud. Successful malicious acts may result in unintentional security breaches such as faults, power outages, financial losses, exposure of sensitive data, turning off or on equipment that other parts of system rely on, depriving use of the system, and so forth. Legitimate users may also unintentionally perform some action that compromises the security of the system.

SUMMARY

The present invention is defined by the following claims, and nothing in this section should be taken as a limitation on those claims. By way of introduction, the preferred embodiments described below relate to an energy management device for use in an energy management architecture for managing an energy distribution system, the energy management architecture including a network. The energy management device includes an energy distribution system interface operative to couple the energy management device with at least a portion of the energy distribution system, a network interface operative to couple the energy management device with the network for transmitting outbound communications to the network, the outbound communications comprising energy management data and a processor coupled with the network interface and the energy distribution system interface, operative to generate the energy management data. The energy management device further includes a tamper prevention seal coupled with the energy management device, operative to substantially deter unauthorized access to the energy management device and indicate any such access, and a seal tamper detection unit coupled with the processor and the tamper prevention seal and operative to detect when the tamper prevention seal indicates that unauthorized access has occurred.

The preferred embodiments further relate to a method of protecting data created, stored and sent by an energy management device that is protected by a tamper prevention seal operative to substantially deter unauthorized access to the energy management device and indicate any such access. In one embodiment, the method includes: generating the data, the data being characterized by an integrity; detecting when the tamper prevention seal indicates that unauthorized access has occurred; and protecting the integrity of the data in response to the detecting.

Further aspects and advantages of the invention are discussed below in conjunction with the preferred embodiments.

DETAILED DESCRIPTION OF THE PRESENTLY PREFERRED EMBODIMENTS

Security Mechanisms

Figure 1:
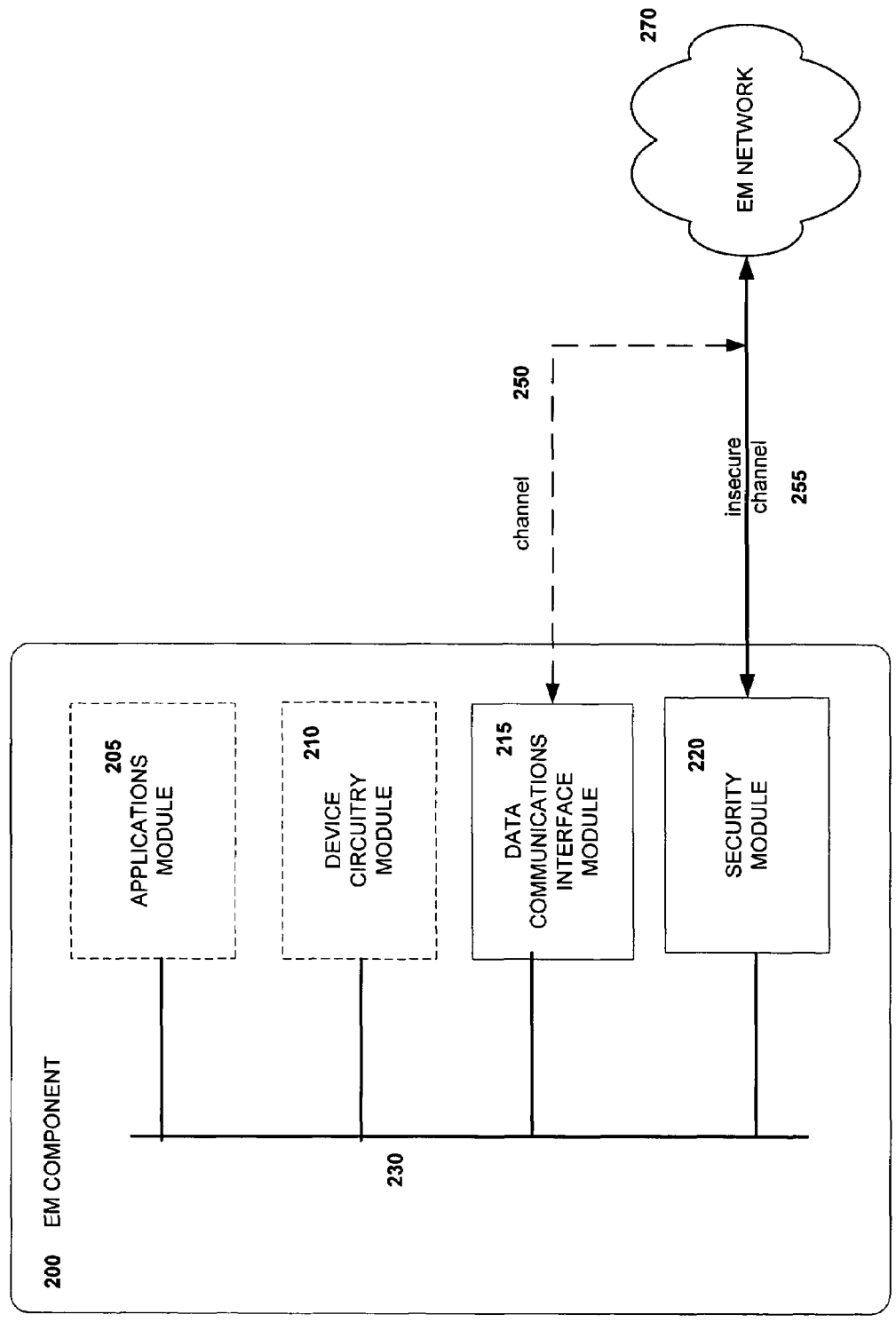
FIG. 1 depicts an embodiment of an EM Component connected with a network.

There are various techniques, including encryption, authentication, integrity and non-repudiation that provide secure communications. Encryption provides privacy by preventing anyone but the intended recipient(s) of a message from reading it. Authentication ensures that a message comes from the person or device from whom it purports to have come from. Integrity ensures that a message was not altered in transit. Non-repudiation prevents the sender from denying that they sent a message.

Various mechanisms can be used to secure parts of the system and the transmission process. Their particular applications to EM systems are described herein.

With public key encryption, each user has a pair of keys, a public encryption key, and a private decryption key. A second user can send the first user a protected message by encrypting the message using the first user's public encryption key. The first user then decrypts the message using their private decryption key. The two keys are different, and it is not practically possible to calculate the private key from the public key. In most applications, the message is encrypted with a randomly generated session key, the random key is encrypted with the public key and the encrypted message and encrypted key are sent to the recipient. The recipient uses their private key to decrypt the session key, and the newly decrypted session key to decrypt the message.

Digital signatures are provided by key pairs as well, and provide authentication, integrity and non-repudiation. In this case a sender signs a one-way hash of a message by encryption with the private key before sending it, and the recipient uses the senders public key to decrypt the message and verify the signature. When signing large documents it is known to take a one way hash function of the plain text of the document and then sign the hash. This eliminates the need to sign or encrypt the entire document. In some cases, the digital signature is generated by encrypting the hash with the private key such that it can be decrypted using the signers public key. These public/private key pairs and associated certificate key pairs may be computed using hard to reverse functions including prime number and elliptic curve techniques.

One-way Hash Functions are small pieces of data that identify larger pieces of data and provide authentication and integrity. Ideal hash functions cannot be reversed engineered by analyzing hashed values, hence the 'one-way' moniker. An example of a one-way hash function is the Secure Hash Algorithm.

The X.509 standard and Pretty Good Privacy ("PGP") each define standards for digital certificate and public key formats.

Various encryption algorithms such as RSA, Advanced Encryption Standard ("AES"), Date Encryption Standard ("DES") and Triple DES exist. RSA is a commonly used encryption and authentication system for Internet communications.

Secure Sockets Layer ("SSL") creates a secure connection between two communicating applications. For the purposes of the present disclosure SSL and Transport Layer Security ("TLS") are equivalent. These protocols are employed by web browsers and web servers in conjunction with HTTP to perform cryptographically secure web transactions. A web resource retrievable with HTTP over TLS is usually represented by the protocol identifier "https" in the Uniform Resource Identifier ("URI"). TLS can and is used by a variety of application protocols.

A URI is a way of identifying an abstract or physical resource or item of content on the Internet.

Secure HTTP (S-HTTP) provides independently applicable security services for transaction confidentiality, authenticity, integrity and non-repudiability of origin.

S/MIME and Pretty Good Privacy ("PGP") provide encryption and authentication for email and other messages, allowing users to encrypt a message to anyone who has a public key. Furthermore, a message can be signed with a digital signature using a private key. This prevents users from reading messages not addressed to them and from forging messages to appear as though it came from someone else.

Kerberos is a secure method for authenticating a request for a service on a computer network that does not require passing the user's password through the network.

Microsoft Passport is an online service that allows a user to employ their email address and a single password to create a unique identity. Microsoft Passport is manufactured by Microsoft Corporation of Redmond, Wash., USA.

Liberty Alliance Project is an alliance formed to deliver and support a federated network identity solution for the Internet that enables single sign-on for consumers as well as business users in an open, federated way.

Internet Protocol Security ("IPSec") secures IP traffic across the Internet, and is particularly useful for implementing VPNs. Point-to-Point Tunneling Protocol ("PPTP") is a protocol that allows entities to extend their local network through private "tunnels" over the Internet. This kind of connection is known as a VPN. Layer Two Tunneling Protocol ("L2TP") is an extension of the PPTP protocol.

The XML Signature syntax associates a cryptographic signature value with Web resources using XML markup. XML signature syntax also provides for the signing of XML data, whether that data is a fragment of the document which also holds the signature itself or a separate document, and whether the document is logically the same but physically different. This is important because the logically same XML fragment can be embodied differently. Different embodiments of logically equivalent XML fragments can be authenticated by converting to a common embodiment of the fragment before performing cryptographic functions.

XML Encryption provides a process for encrypting/decrypting digital content, including XML documents and portions thereof, and an XML syntax used to represent the encrypted content and information that enables an intended recipient to decrypt it.

Web Services Security ("WS-Security") is a proposed IT standard that addresses security when data is exchanged as part of a Web Service. WS-Security specifies enhancements to SOAP messaging aimed at protecting the integrity and confidentiality of a message and authenticating the sender. It also specifies how to associate a security token with a message, without specifying what kind of token is to be used. It is designed to be extensible with future new security mechanisms.

A Media Access Control Address ("MAC Address") is a number that is appended to a digital message and provides authentication and integrity for the message.

Perimeters

Perimeters provide limitations on who and/or what can enter into or exit from a network. This limitation on traffic between networks provides access control to specific resources. Perimeters include both physical barriers and logical barriers. Physical barriers include walls, doors, fences, buildings, rooms, moats, electric cabling (equipment protected behind energized electric cabling can't be accessed safely), access to network wiring, and range of a wireless transmission. Logical perimeters only let certain traffic between networks based on the nature of the traffic, which includes the direction of flow of traffic across the perimeter and the contents of such traffic. These contents can include protocol headers, addresses, ports, pad bytes, all bytes, and all bytes excluding pad bytes. In layered network protocols, perimeters can be established that allow traffic with certain properties at various protocol layers either singularly or in combinations. Perimeters are frequently constructed to allow unsolicited messages of specific protocols to be initiated from the known side of the perimeter and to only allow solicited messages from the unknown side of the perimeter. It can be the case that a solicited or unsolicited message in one protocol may contain an unsolicited or solicited message in another protocol. Logical perimeters may also provide address translation and protocol conversion, caching of data or other functions.

Perimeters are by nature security barriers, because outside access to specific resources protected within the perimeter are limited. For example, all entities outside the perimeter may be allowed only to access web pages hosted inside the perimeter, and no other resources.

An example of a perimeter that uses HTTP to limit the number of messages going out and coming in operates as follows. The perimeter limits egress of messages to HTTP unsolicited messages carried over TCP/IP port 8080 and behaves as an HTTP proxy by forwarding the HTTP messages to the appropriate HTTP server and ports defined by the URI identified in the HTTP request. The perimeter limits ingress to solicited HTTP responses which are also translated at the perimeter to appear as HTTP responses to the sender of the original unsolicited message.

HTTP is a known protocol used for transferring files across the World Wide Web. These files include text, graphic, image, sound, video and other multimedia files.

Perimeters provide various benefits, including the reduction of unauthorized traffic, the provision of coarse-grained access control to components protected by the perimeter, and reduction in the unauthorized and/or undesired egress of data. Components protected by a perimeter show improved performance by not having to deal with as much traffic buffer overruns or other attacks, by not needing to have the ability to restrict access to specific ports, by collaborating with resources behind another perimeter without concern for security, by not being subject to direct attacks, by not having to implement as many security functions (if any), and by spending less time processing security functions because unauthorized traffic has already been reduced.

Access may be further limited to those entities providing evidence to the perimeter of authorization to access certain resources across a perimeter. Such evidence may be comprised of one or more authorization tokens. A common authorization token is a solicited message or a response to an unsolicited message addressed to an entity authorized to access a resource. Other common authorization tokens include preauthorized addresses such as telephone numbers, host name, host TCP/IP address, MAC address of an entity authorized to access a resource, unencrypted or encrypted passwords, tickets based on Kerberos or Kerberos-like infrastructures such as Microsoft Passport; a cryptographic hash based on a shared secret or private key of the entity. Authorization tokens are frequently specified by protocols such as S/MIME, WS-SECURITY, and some lower level protocols. Authorization tokens can also be used to verify data integrity.

Perimeter Enabling Devices are able to create logical perimeters when coupled with certain network topologies. Examples of perimeter enabling devices include but are not limited to: TCP/IP routers, packet filtering firewalls, stateful inspection firewalls, application gateways for TCP/IP networks; devices that filter and route SOAP messages based on contents of the SOAP message; HTTP to MODBUS gateways; HTTP Proxy servers (including reverse-proxy configuration), ION® to MODBUS gateways found in ION® Enterprise and on ION® devices, and SMTP to NNTP gateways used for posting USENET messages from email.

A firewall is a hardware or software boundary that sits between two networks and enforces a set of rules about what data can travel from one network, through the firewall, to the other network. One firewall often does not provide enough protection, and multiple firewalls layered one inside the other can provide a higher level of security. Some proxies store data and can filter and forward it on. A proxy (or application gateway) when combined with a firewall acts as a go between for users inside the firewall and resources on the outside. Some proxy firewalls can make smart decisions about what to do with requests and data.

ION® devices and ION® Enterprise are manufactured by Power Measurement Ltd, of Saanichton, B.C. Canada.

Both a logical and physical perimeter may be erected around resources. For example, a Meter Reader driving to a secure facility, first gains physical access to the secure facility, perhaps with a key or a combination, and then gains logical access to an EM device, perhaps with a password or other authorization token.

Secure Energy Management Component

Referring now to FIG. 1, Energy Management ("EM") Component 200, which may be an EM device such as an IED, an embedded device, or a WAGES device; or an EM server, such as a computer, gateway or cluster, is coupled via one or more insecure channels 250, 255 with an EM Network 270. Herein, the phrase "coupled with" is defined to mean directly connected to or indirectly connected through one or more intermediate components. Such intermediate components may include both hardware and software based components. It will be appreciated that EM Component 200 can easily be coupled with other components and networks not shown in this figure via secure or insecure channels, and that EM Component 200 may act as a gateway to both secure and insecure EM Devices.

EM Component 200 contains a Security Module 220, a Data Communication Interface Module 215, and an optional Device Circuitry Module 210 and an optional Applications Module 205, all of which may be coupled with one another via a common bus 230. It will be appreciated that EM Component 200 may contain other modules as well.

The Applications Module 205 can include an SMTP server, an HTTP server, and HTTP client, an FTP server, as well as energy management applications such as energy recording, set point modules, ION® Modules or other modules used for manipulation, measuring or managing energy data.

The Device Circuitry Module 210 includes at least one of voltage and current interface circuitry, digital 10 circuitry, analog IO circuitry, pulse counters, transducers, sensors, converters or programming logic.

The Data Communications Interface 215 is responsible for communications with components external to EM Component 200. The Data Communication Interface 215 may interoperate with Security Module 220 to provide secure communications between EM Component 200 and EM network 270.

The Security Module 220 is responsible for all types of security on EM Component 200. These types of security may include one or more of the following functions, described herein: security processing, address blocking, intrusion detection, access control, biometric security, photo imaging, secrets protection, and implementation of perimeters and access zones. Security Module 220 can also provide other functions such as signing, encryption, authentication, measurement assertions and federated security.

The main functions of Security Module 220 are to prevent unauthorized access to resources on EM Component 200, to mitigate or prevent denial of service attacks, to provide private communications over channels 250, 255, to participate in authenticable exchange of data with external EM Network 270, and to communicate security information with other security modules.

Security Processing

Processing related to the Security Module 220 may take place on a dedicated security processor, or on a processor used for other purposes as well. The processing can occur on a single processor or be distributed across multiple processors. These processors may be located internally or externally to EM Component 200.

Security processing includes data encryption, data decryption, authentication, address blocking, gatewaying of data to secured and unsecured devices, generating and verifying digital signatures, hashes and or message digests. These algorithms may be computationally intensive, and may bog down general-purpose processors. For this reason it may be preferable to provide a dedicated security processor, to employ a specialized processor optimized for scalable security processing, or to provide a processor that incorporates both general purpose processing and specific security processing features. Where EM Component 200 is a legacy device it may be difficult to retrofit or integrate security applications into the device. In this case it makes sense to retrofit a security processor in a component separate from EM Component 200.

A security processor whether located internal or external to EM Component 200 may also provide security processing for components coupled to EM Component 200.

Address Blocking

One way of reducing unauthorized access to EM Component 200 is for EM Component 200 to accept connections or packets only from pre-authorized addresses, where the address may be a phone number, IP address, MAC address, or other method for uniquely addressing a component. This is known as address blocking. Address blocking ensures that the user or server connecting to EM Component 200 is making contact from a pre-authorized location, which provides increased security against malicious attacks and may improve EM Component 200 performance during periods when it is targeted with traffic from unauthorized addresses, allowing EM Component 200 to continue functioning despite the attempted attack. Blocking based on source address is far quicker than using Public Key Infrastructure ("PKI") on every request; which is expensive processor-time-wise. Address Blocking is particularly relevant in the case where EM Component 200 is an EM device, as there are typically a limited number of remote, authorized connection locations. Address blocking also provides obscurity as it is harder for an antagonist to find a vulnerability to attack.

Where the method of communicating with EM Component 200 is via the telephone system, EM Component 200 can be configured with a preset dialup number, as in a call back system. When a user or automated server such as MV90, calls EM Component 200, the Security Module 220 registers that there is a call, and instructs the modem (not shown) to hang up. MV90 is a software system manufactured by Itron, located in Spokane, Wash., USA. The Security Module 220 then instructs the modem to dial the preset number. In this fashion users and servers can only access EM Component 200 if they are calling from the preset number, and unauthorized callers are blocked from accessing EM Component 200. In some configurations it may be reasonable to place all the intelligence directly in the modem, in which case the modem recognizes that there is an attempted contact, the connection is dropped, and the modem then places a call to the preset number.

In an alternate embodiment, the modem or Security Module 220 utilizes call display technology, electronically identifying the caller's phone number and only accepting the call if that number is on a predefined list. The modem or Security Module 220 may also record all incoming numbers to later identify who is calling in.

In an alternate embodiment, EM Component 200 is located on a private phone system, and only other components on that private phone system can dial in to EM Component 200.

In an alternate embodiment, where EM Component 200 is linked to a public network such as the Internet, EM Component 200 is even more vulnerable to a denial of service attack. The Security Module 220 of EM Component 200 can be programmed to allow access to either all services, or only a given service or TCP/IP port based on predetermined criteria such as source IP address or MAC address. MAC address-based Access Control Lists ("ACLs") allow only registered components to access EM Component 200. Alternately, each packet may be validated against an authorized connection.

Any case of an unauthorized attempted connection or use of EM Component 200 can be recorded and reported via Simple Network Management Protocol ("SNMP"), outbound XML web services, paging networks, or by use of a log made available for on-demand requests. SNMP is the protocol governing network management and the monitoring of network devices and their functions.

Security Module 220 can also filter on a combination of source address and the percentage of free processor time on EM Component 200 to decide whether to accept a connection. For example, EM Component 200 can refuse traffic to certain port or services, and possibly from specific addresses when resources are limited.

Security Module 220 can also identify and limit traffic from source addresses identified to be antagonistic. Alternately all communication can be initiated by Security Module 220, which never accepts a connection request from an external component. In this case Security Module 220 is preconfigured with external components to communicate with.

Intrusion Detection

Where EM Component 200 is an EM Device, Security Module 220 can provide various tamper resistant and tamper evident units. For example, a tamper device may be provided which self-destructs when tampering occurs. The component is well designed so that an attacker can't easily tamper with it without leaving evidence such as broken seals and cut wires. Furthermore, Security Module 220 can record all control actions made on EM Component 200, creating an audit log if damage is later identified, and disabling or deleting confidential data by firmware if an attack is detected by the Security Module 220.

Figure 3:
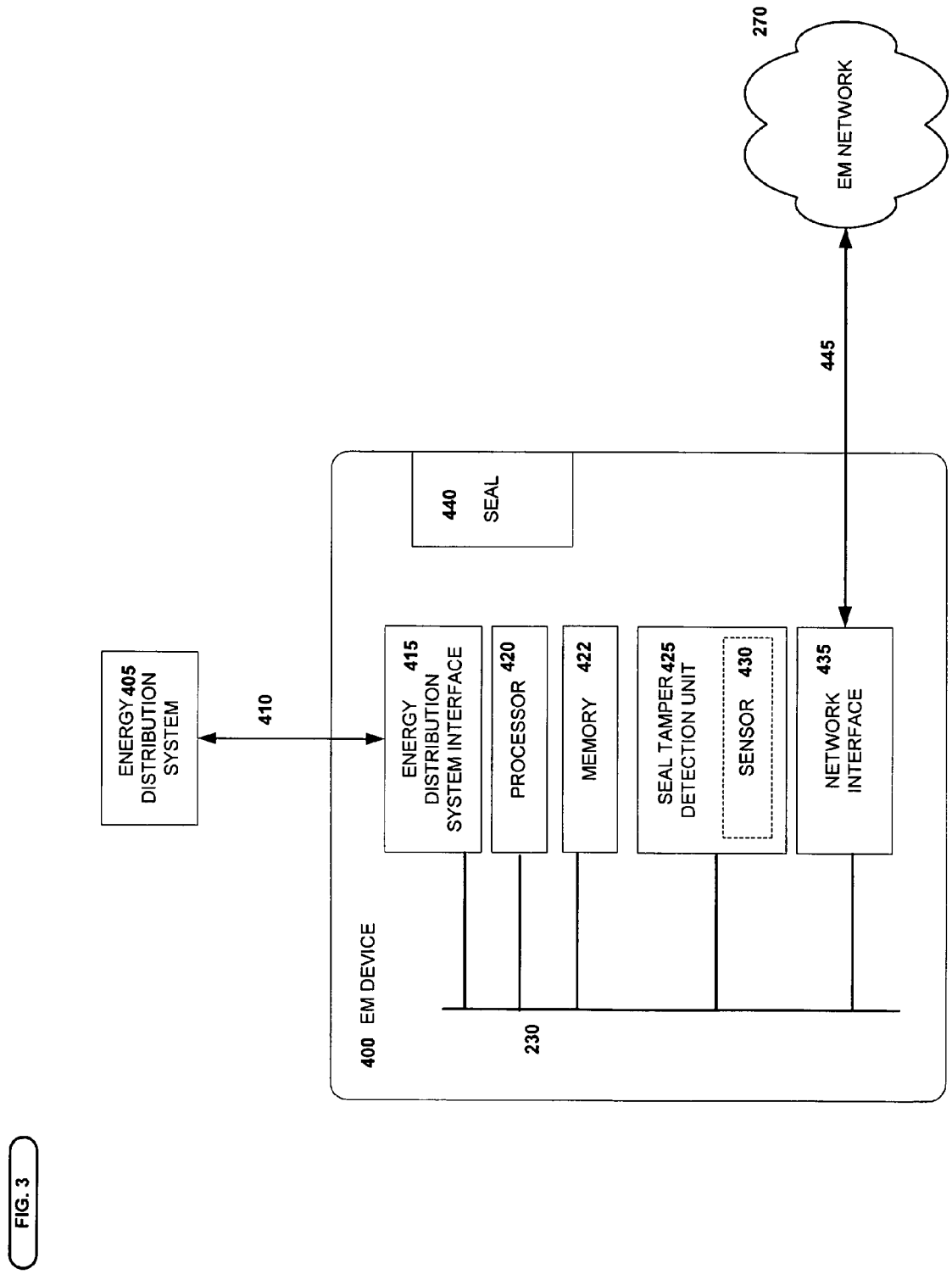
FIG. 3 depicts an embodiment of an EM Device having a Seal Tamper Detection Unit.

Referring now to FIG. 3, an exemplary EM Device 400 is depicted. EM Device 400 has various modules, including an Energy Distribution System Interface 415, a Processor 420, a Memory 422, a Seal Tamper Detection Unit 425 and a Network Interface 435, which are coupled by a common bus 230. The Energy Distribution System Interface 415 is coupled with an energy distribution system 405, via a channel 410. The Energy Distribution System Interface 415 is operable to implement EM Device 400 functionality, such as metering/measuring power, measuring and monitoring power quality, implementing a protection relay function, or other functionality of EM Device 400. The network interface 435 is coupled with the EM Network 270 via a channel 445, and transmits EM data to and receives EM data from the EM Network 270. The processor 420 includes the logic circuitry (not shown) that responds to and processes the basic instructions that drive EM Device 400. The memory 422 is operable to store and retrieve data.

EM Device 400 further has at least one seal 440 that may be external or internal to EM Device 400, and may be attached during manufacture, installation, or at a later date. A seal is a physical item that shows an indication when it has been tampered with. A seal may be made of various materials, and come in various designs, such as wire, lock, glass vial, plastic tie, electrical fuse, gravitational or inertial/shock detector. For example, where the seal is a plastic tie, it will generally include a tab with a unique identifier, and a locking mechanism that cannot easily be opened without breaking the seal. The seal 440 can protect various parts of the EM Device 400 or surroundings of the EM Device 400, including a reset or other control button on the EM Device 400, the casing of the EM Device 400, or an external enclosure around the EM Device 400. EM Device 400 may have multiple seals that protect different parts of the device. Seals include revenue seals and metering point id seals.

In one embodiment, Seal Tamper Detection Unit 425 detects whether seal 440 is intact or broken. Seal 440 may be broken due to a malicious attack, or due to some natural event, such as an earthquake, age or environmental related wear, defect or accidental striking by an object which causes seal 440 to break and potentially causing EM Device 400 to become partially dislodged from its socket or base. Seal Tamper Detection Unit 425 may be part of Processor 420, part of Security Module 220 of FIG. 1, or be a standalone component. Seal Tamper Detection Unit 425 may or may not be enabled when EM Device 400 is delivered to the customer. When Seal Tamper Detection Unit 425 is not enabled on delivery, it may be enabled by the owner or other authorized person.

Seal Tamper Detection Unit 425 may include a sensor 430 to aid in detection of a seal tampering event. Sensor 430 may be physically part of Seal Tamper Detection Unit 425, or physically separate, and coupled with Seal Tamper Detection Unit 425. Alternately, Seal Tamper Detection Unit 425 may employ other means for detecting that a tampering event has occurred.

Figure 4:
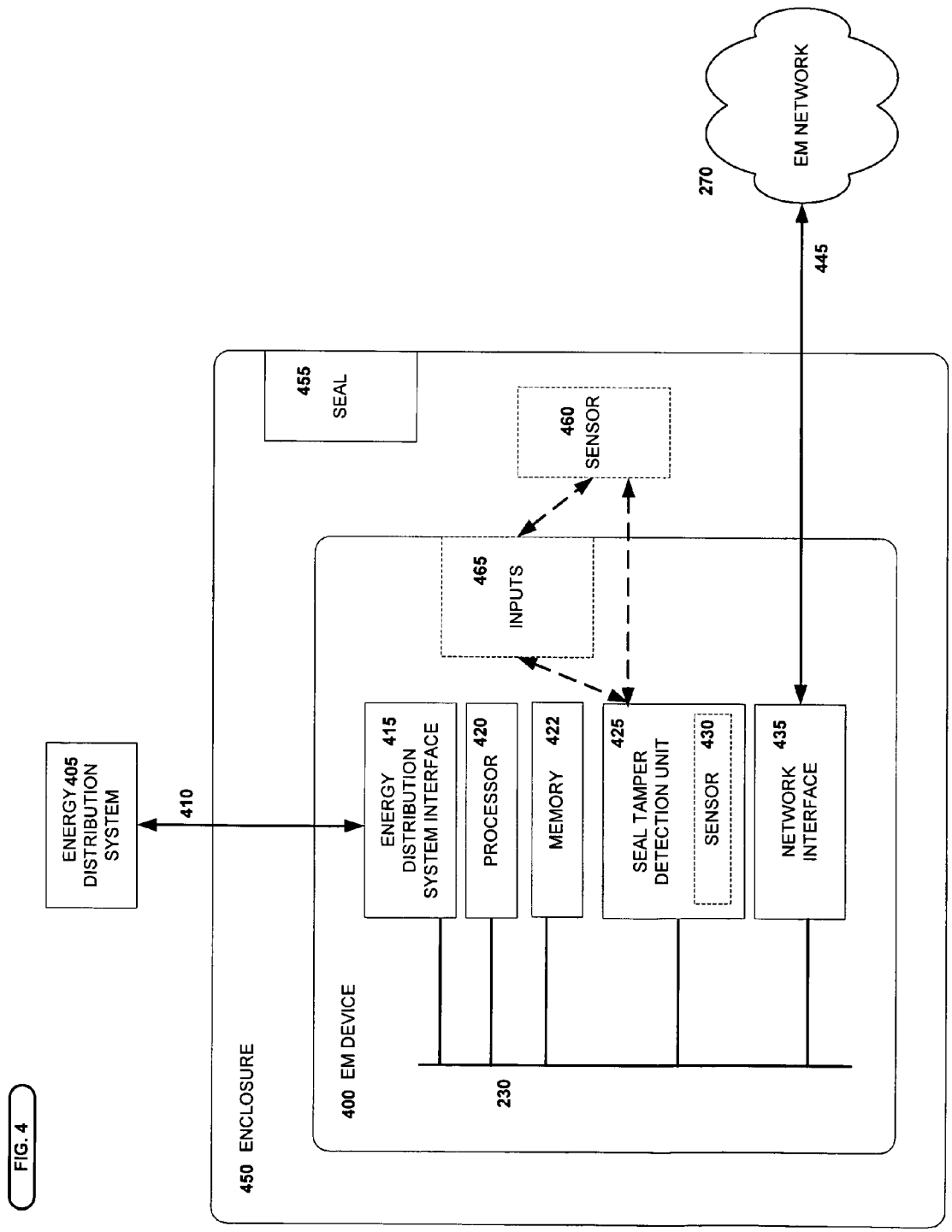
FIG. 4 depicts an embodiment of an EM Device having a Seal Tamper Detection Unit.

Referring now to FIG. 4, EM Device 400 of FIG. 3 is depicted within an enclosure 450, which protects EM Device 400 from access, tampering or accidental damage. Enclosure 450 is further protected by a seal 455 coupled with the enclosure 450, which provides physical evidence when enclosure 450 has been tampered with. In addition to, or instead of optional sensor 430, enclosure 450 may include a sensor 460 to aid in detection of a seal tampering event. Sensor 460 may communicate directly with Seal Tamper Detection Unit 425, or may be coupled with inputs 465, where inputs 465 are coupled with Seal Tamper Detection Unit 425. Inputs 465 are part of EM Device 400 and may also be contacts or terminals.

Figure 5:
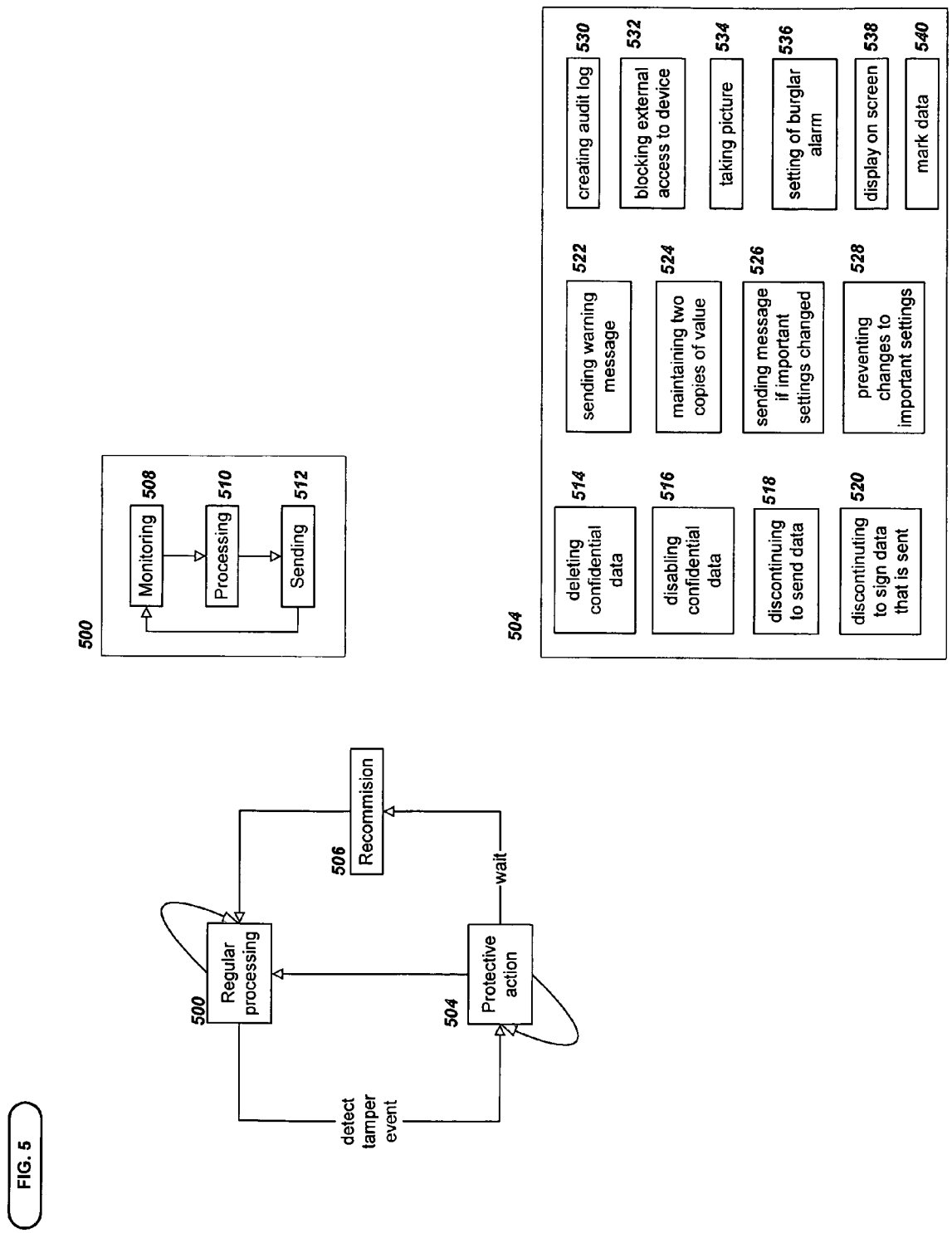
FIG. 5 depicts a flow chart of EM Device processing when a seal tamper event detected.

Referring now to FIG. 5 a flowchart of EM Device 400 processing is depicted. Regular processing 500 is interrupted when a tamper event is detected. One or more protective action(s) 504 are taken, after which regular processing 500 may resume, or alternately, EM Device 400 may wait for recommissioning. Recommissioning 506 entails ensuring that EM Device 400 is installed, measuring and communicating correctly, and may entail taking EM Device 400 away for further inspection, replacing it, or simply having a technician look at it and correct it in place. Once EM Device 400 has been recommissioned, regular processing 500 recommences.

Regular processing 500 entails monitoring 508 the energy distribution system 405, processing 510 data received from the energy distribution system 405, and sending 512 processed data to EM Network 270.

Protective action 504 entails taking one or more actions to protect data created, stored and sent by EM Device 400 from being compromised, i.e. stolen, copied, altered, destroyed, etc. Different actions 504 may be taken depending on which seal or combination of seals are tampered with. For example, where EM Device 400 has confidential data such as device identity, private key or certificates used to sign outgoing data, this confidential data may be deleted 514 or disabled 516. Alternately EM Device 400 may discontinue 518 the sending of data to EM Network 270. Alternately EM Device 400 may continue 520 to send data to EM Network 270, but refuse to sign either all data or certain data. Some owners or data users may not wish to receive any data that cannot be signed, whereas some owners or data users may still wish to receive data, with the knowledge that it may not be accurate, as it may be of more value than no data at all. Alternately EM Device 400 may send 522 a message warning the EM Device 400 owner or data user that the seal has been tampered with and any received data may have been compromised, i.e. may be suspect. This message may be signed by a private key if it hasn't been deleted as part of the protective action 504.

Alternately modification of device settings, which are part of the device configuration, such as CT/PT ratios, may be prevented 528 when a seal has been tampered with. Alternately, changes to settings may be permitted, but a log of changes is maintained and/or a message is sent 526 to the EM Device 400 owner or data user indicating that the setting has been changed. Alternately, EM Device 400 may appear to make the change to the setting, but actually maintains 524 two copies of the setting and associated data value(s), the first as if no change was made, the second based on the change. This may be done for any setting, including demand, CT/PT ratios etc. Later, the owner can accept whichever values are actually the correct ones. This approach allows for a graceful recovery from cases where an authorized seal removal event was incorrectly identified as a tampering event.

Alternately an audit log of all events, changes made, settings adjusted etc. may be created 530. The audit log may be encrypted and/or hashed. Alternately external access into EM Device 400 may be blocked 532 by cutting communication links between displays, keyboards, keypads, ports and the like, and the internals of EM Device 400. Alternately, an integrated camera may take a picture 534 of the intruder. Alternately a burglar alarm is set off 536. Alternately, some sort of visual identifier may be displayed 538 on a screen of EM Device 400 indicating that a seal has been compromised. Alternately, the data may be marked 540 with some identifier to indicate that a seal tampering event has been identified and that the data may be unreliable. Actions 538, 540 are useful when data from EM Device 400 is read by a handheld reader.

Seal Tamper Detection Unit 425 may distinguish between valid seal removal by device owner or technician, and a tampering event in a variety of ways. For example, the technician may announce themselves as authorized to make the change prior to removing the seal, for example by entering a code into the front panel, or by authenticating with a Radio Frequency Identification ("RFID") or proximity based authorization tag. Alternately, EM Device 400 checks with the owner when a seal tampering event is identified. For example, when Seal Tamper Detection Unit 425 identifies that the seal 440, 455 has been compromised, a message is sent to the owner reporting that an event has occurred, and requesting reply if this is an authorized or unauthorized change. In cases where the breakage of seal 440, 455 was authorized, some protective action may or may not have been taken by EM Device 400. In the case where action was taken, a process is required to return EM Device 400 to a regular processing state. For example, where a private key has been erased, a new key would have to be installed. EM Device 400 owner will know if the breakage was valid and whether they should trust the new key.

A reset or other control button or security device may be external to the EM Device 400 and protected by its own seal, or hidden within the EM Device 400 and protected by a seal that protects the casing. Either way, electronics in the EM Device 400 can identify when reset buttons are pressed. An algorithm on the meter can check and take appropriate action, as described above, when reset buttons are activated.

When a seal 440 protects the EM Device 400 casing or a seal 455 protects enclosure 450, there are various techniques for identifying that these seals 440, 455 have been compromised. For example, various types of sensors 430, 460 such as electronic, electromechanical, electromagnetic, optical and ultrasonic sensors may be used to identify when the casing or enclosure 450 is opened.

In one embodiment, a limit switch or micro switch, or other device operable to create a closed or open circuit, is placed on a circuit board and held in an activated state by the casing, such that when the casing is removed the connection is broken, e.g. the circuit changes state from open to closed or closed to open, or alternatively a voltage or current drop or spike is created, triggering the Seal Tamper Detection Unit 425 to identify that seal 440 is removed.

Alternately, a visual CCD or CMOS imaging sensor, digital camera or digital video camera photographs seal 440, and triggers the Seal Tamper Detection Unit 425 when seal 440 is tampered with. Tampering may be detected by pattern recognition algorithms executed on the output of these devices.

Alternately, where seal 440 prevents EM Device 400 from being moved, various position, movement or proximity sensors, such as pin on back of EM Device 400 which attaches to the socket or base, an optical proximity sensor, an optical motion detector, a grounding tab on EM Device 400, an ultrasonic sensor, an electromagnetic sensor or a gyroscope can be used to identify when EM Device 400 has been moved, and thus that seal 440 is compromised. For example, an ultrasonic transmitter and receiver may be used to detect distance. It may be placed on the back of EM Device 400 to detect when EM Device 400 is moved from its socket or base. Alternately, it may be placed beneath the casing of EM Device 400 to detect when the casing is removed. Alternately, when enclosure 450 surrounds EM Device 400, it may be placed within enclosure 450 and used to detect the proximity of a cover or lid, or whether EM Device 400 is present.

When EM Device 400 is in enclosure 450 protected by seal 455, the sensors described above may be used to identify that seal 455 has been tampered with. For example, auxiliary inputs 465 on EM Device 400 may be connected to an external sensor 460, such as a limit switch, to identify when the enclosure 450 has been opened.

Alternately, when EM Device 400 is a revenue meter, bayonets on EM Device 400 may be used to detect if EM Device 400 unplugged. For example, two unused bayonets may be shorted together inside the revenue meter socket with appropriate circuitry within the meter operative to detect if these bayonets have become disconnected from the socket.

Alternately, a vacuum or high pressure may be created in the enclosure 450 which would be compromised by opening it. Alternately, EM Device 400 checks the IP net and sub-net addresses to ensure it is connected to the correct network to detect whether someone has accidentally or intentionally redirected communications by altering packet routing or physically re-routing a network cable, or otherwise altering the network to which the EM Device 400 is connected.

When the seal becomes compromised during a power failure the event may be difficult to identify after power returns. An energy storage device, such as a battery, capacitor, super capacitor etc that maintains Seal Tamper Detection Unit 425 functionality may be implemented to handle this situation. For example, EM Device 400 may maintain a flag in non-volatile memory that has a certain bit sequence in it, which may be encrypted. When seal 440 or seal 455 is tampered with, the flag is set by the Seal Tamper Detection Unit 425. Once power returns, the flag is checked, and if it is set, then the EM Device 400 can take any action described above, including sending out a message that a security violation has occurred.

In an alternate embodiment, an Intrusion Detection Unit identifies unauthorized attempts, including network attacks, to access EM Device 400, by monitoring for an attack and watching for abnormal activity. The Intrusion Detection Unit learns what is normal for EM Device 400 and uses some combination of rules, fuzzy rules, statistics, and Artificial Intelligence ("AI") techniques, to spot anomalies. The Intrusion Detection Unit may also inspect data for sequences of suspicious packets, or audit logs for sequences of suspicious actions. The Intrusion Detection Unit may be able to identify what or where the attack is, and which features are affected. When an attack is identified defensive action may be taken, such as blocking external access to EM Device 400 by cutting communication links between displays, keyboards, keypads, ports and the like, and the internals of the device. The unauthorized attempt is recorded in event or audit logs, and an integrated camera can take a picture of the intruder if the attack is a physical one. The attack is reported by means of sounding an alarm or sending a message to a central control area. The Intrusion Detection Unit can also detect whether confidential data on EM Device 400 have been tampered with, or whether there has been an attempt to tamper with the secrets.

The Intrusion Detection Unit may deploy one or more 'honey pots' on EM Device 400. A honey pot is an area of the device that appears attractive to an intruder. Honey pots are able to gather data about an intruder's identity and what they want to do, without allowing them to access the real system. Audit logs from the honey pot can be used to prosecute the intruder.

For example, a honey pot may attract antagonists to a specific target such as a fake billing system or module with the purported ability to control the grid. As the antagonist attempts to access this target, the honey pot logs the traffic, generates a report, and may forward the report to the authorities and to the antagonist's ISP in real time, as the attack is happening. The antagonist's source IP address and addresses in that range can be blocked from accessing EM Device 400 until the problem is resolved. Confidential data such as device identity, private key or certificates used to sign outgoing data may be deleted or disabled.

The Intrusion Detection Unit can deploy one or more burglar alarms, which are devices or pieces of software that alarm when they are accessed. They are positioned to protect sensitive applications or data, and may be configured to alert the whole system that it is under attack, or to contact an administrator.

Any recorded event or system logs may be hashed and encrypted so that they can be used in court as evidence.

Passwords

Not only must Security Module 220 identify antagonists attempting to access the device or system, but it must also allow access to bona fide users. User identification can be provided by keys, combinations, photo id, passwords, pass phrases, smart cards, authorization tokens, biometric security devices or any other identity recognizable by the entity granting entry.

A smart card is a tiny secure crypto processor embedded within a credit card-sized card. One implementation of smart cards is defined by the ISO/IEC 7816 series of standards.

Authentication tokens are physical tokens such as keys or corporate badges, and can be made more secure if used in combination with a password or PIN number. Alternately a Radio Frequency Identification ("RFID") based technology may be employed. RFID is a technology that incorporates the use of electromagnetic or electrostatic coupling in the radio frequency portion of the electromagnetic spectrum to uniquely identify an object, animal, or person.

Preferably, keys, passwords and the like are replaced frequently, keys no longer in use or that have been attacked are revoked, and certificate revocation lists are checked regularly.

Security Module 220 may have separate security access levels which are configurable for various functions such as relay, meter and power quality. For example, a relay technician would have a password that would allow them to set up the relay functions of the device and a power quality engineer may be able to access and set up the power quality information in the device. Another example would allow a relay technician to modify protection settings but not allow the relay technician to reset kWh accumulation on EM Component 200. Similarly, a meter technician may be unable to adjust relay settings on EM Component 200 but may be able to reset kWh accumulation. This allows a single EM Component 200 to provide functionality of three existing devices while maintaining the security of separate devices. In addition, EM Component 200 can have multiple passwords for each group of functions in EM Component 200. For instance, one password may allow the tripping of a breaker but not the adjustment of the protection setting(s). This means that a utility can access the power metering data while a plant supervisor can configure protection setting(s), and a power system consultant can make use of the power quality features of EM Component 200 while each of these three individuals is barred from accessing the functionality outside of their responsibility.

Security Module 220 may also provide for passwords that allow access to functions of the device only during certain time periods. This allows, for instance, a worker to control a breaker for load shedding only during certain times of the day. For instance, a supervisor can use this to restrict access to a particular trip control(s) to avoid shedding a time critical load during the critical run time.

EM Component 200 may also provide for passwords that allow access to functions of EM Component 200 only during certain power system site conditions. For instance, this disallows a worker from remotely energizing a circuit via the central controller by closing a breaker if an industry standard lockout mechanism or contact was used to protect the safety of a service worker. In another instance, a worker may not be able to trip a breaker that is running a fan, if a piece of operating equipment, such as a transformer, requires that fan to run.

Security Module 220 may enforce password standards such as length, character, complexity and expiration.

Biometric Identification

Biometric security on EM Component 200 is provided by a biometric identification device such as a fingerprint scanner, facial recognition scanner, voice recognition scanner, blood testing scanner, retinal scanner, breath scanner or bone mass scanner. This allows for the identification of a user and determination of access level to EM Component 200 without the necessity of the user to remember a password. The biometric scanner can be combined with a password reader as well. The scanner can be integrated with EM Component 200, or may be located in an auxiliary component closely coupled with EM Component 200.

In the case of a fingerprint scanner, a sensor scans the user's fingerprint and compares it to known fingerprints and gives the user appropriate access to EM Component 200, and possibly to components coupled with EM Component 200. Sensors work in many different ways. There are optical, capacitive, thermal, RF-imaging and mechanical sensing methods. Most fingerprint-capture systems output a raster-scan image for fingerprint features. Off-the-shelf software exists to characterize and match prints.

Photo-Imaging

EM Component 200 may include an infrared and/or visual CCD or CMOS imaging sensor camera. The camera my be included as part of EM Component 200, or may be external, such as in a secure external enclosure, possibly concealed. The camera can be triggered by Security Module 220 in response to a detected event. For instance if an operator changes a setting in EM Component 200, a short video clip of the operator is stored in the event memory of EM Component 200, or if the Seal Tamper Detection Unit 425 detects that a seal 440, 455 has been tampered with a photograph of the intruder may be stored in the event memory of EM Component 200. This allows a plant supervisor to determine who caused a change to the power system that resulted in a false breaker trip or identify persons attempting to tamper with the power system. Alternately, the camera can be triggered any time there is an unexpected movement, which may indicate an intruder.

When a camera that is able to detect infrared light is installed in EM Component 200, images in a dark setting as well as temperature rise in conductors, transformers, or equipment can be detected. If a rise in temperature is detected, this can be signaled to the service personal or a central controller to respond to the situation and reduce the possibility of a power outage. Alternatively, EM Component 200 may utilize a slow shutter camera or any other imaging technology that would allow viewing in low light conditions.

Since the Security Module 220 can detect and respond to events by triggering a camera, it is possible to record a video clip when a fault occurs in the power system. This is especially valuable in the case of events that cause damage or destruction of the facility and/or power system equipment. If EM Component 200 can be recovered after the event, the video images in the memory (which may be non-volatile flash EEPROM) may still be recoverable allowing a post event determination of the reasons for the damage or destruction. In addition, other events leading up to the damage or destruction may also still be recoverable from memory allowing a post-event determination of the reasons leading up to the damage or destruction. Circuitry may also contain a light detector located, for example, inside switchgear within the power system. The light detection circuitry can register whether or not an arc is occurring inside the gear. The central controller can retrieve all this information in addition to power flows and harmonic disturbances in the power system to record and determine an overall sequence of events and propagation of faults in the power system.

Any recorded images may be stored in EM Component 200 for later reference, or sent via email or FTP to a central control area or administrator.

Concealing Secrets

Any confidential data such as private keys, certificates and passwords should be stored in a safe place on EM Component 200. Indeed these confidential data should be stored so carefully that an antagonist with physical access to the device can be prevented from, or at least find it very difficult to determine the secrets by inspecting memory, firmware, monitoring the data bus 230, or taking EM Component 200 apart. Techniques for securely storing such secrets include steganography, hashing, tamper resistant memory, security chips and scattering bytes around the device.

Steganography is the hiding of a secret data within an ordinary message or data, and the extraction of the secret data by a recipient or authorized entity. The secret data is hidden so that nobody suspects that it exists, and anyone scanning the ordinary message or data it will fail to determine that it contains encrypted data.

Software Bugs

Poorly developed software or firmware running on EMC 200 can result in buffer over-runs, unhandled CPU faults, bus faults and so forth. This is particularly risky when input data is coming from external EM Network 270. An attacker may intentionally present a type or quantity of data calculated to cause a fault, giving the attacker an opportunity to tamper with EM Component 200 and its data. Rigorous coding and testing practices eliminate some of the risk, but not all. The software and firmware may be designed to treat buffer over-runs, unhandled CPU faults, bus faults and so forth in the same way as an intrusion is treated, by erasing private keys and refusing to sign data or communicate.

Access Zones

Figure 2:
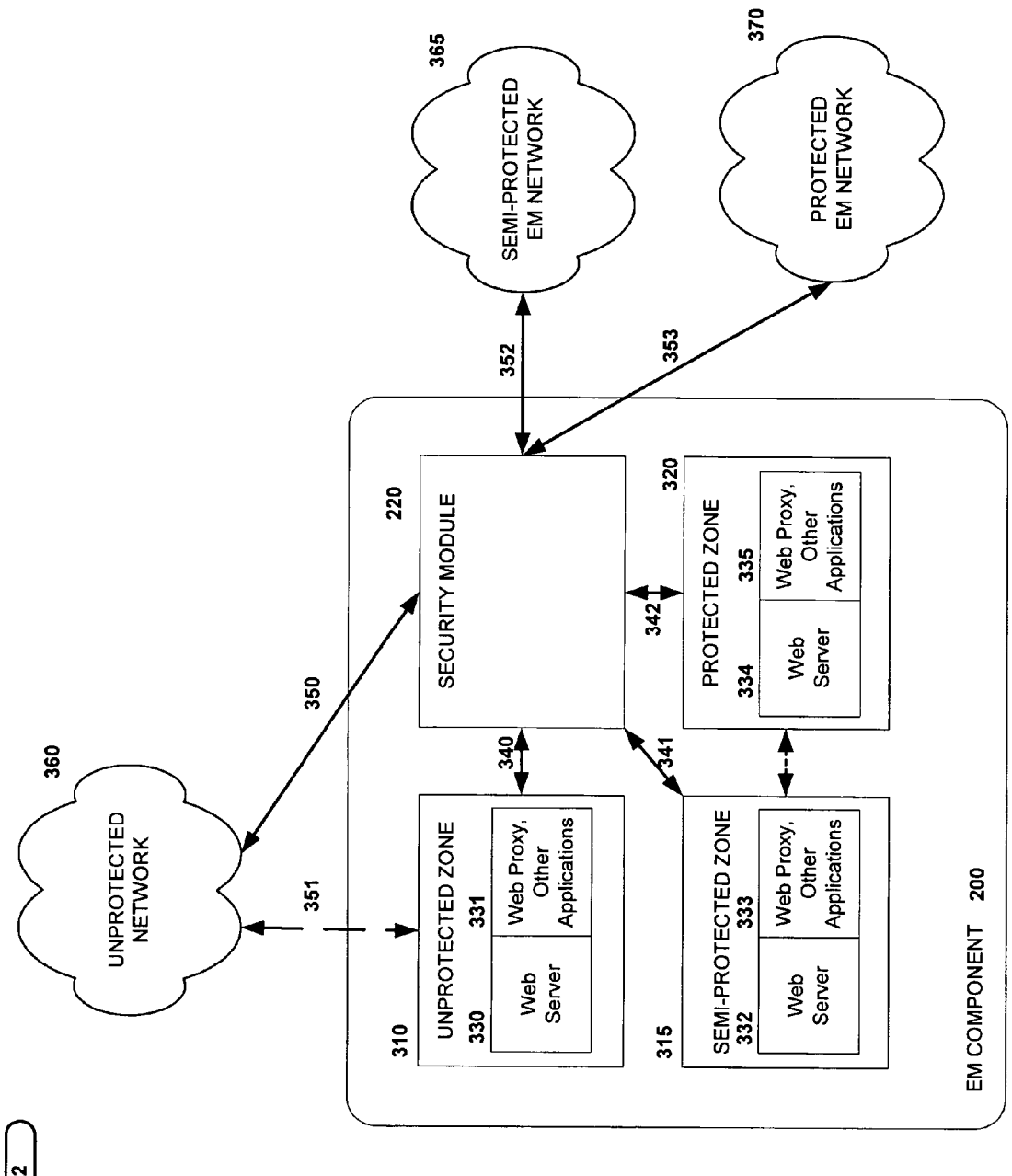
FIG. 2 depicts an embodiment of an EM Component connected with multiple networks.

Referring now to FIG. 2, EM Component 200 (as previously depicted in FIG. 1) contains one or more access zones 310, 315, and 320. Access zones 310, 315, 320 may be either virtual or physical divisions on EM Component 200 that serve to manage access to various areas and services. These zones are created and separated by perimeters implemented by the Security Module 220. In some cases the perimeter is a firewall.

Access to zones 310, 315, 320 is managed by Security Module 220 via links 340, 341, 342. Access zones 310, 315, 320 may have varying levels of security, ranging from unprotected through semi-protected and protected. Each zone can provide services to other components, internal or external to EM Component 200. These services can include Web Servers 330, 332, 334, as well as Web Proxies and Other Applications 331, 333, 335 such as SNMP, HTTP Server, gatewaying, SOAP gatewaying, FTP, TFTP, and ION® Applications such as the measurement and processing of EM data.

EM Component 200 can be coupled to a number of networks 360, 365, 370, each of which have varying levels of security, ranging from unprotected through semi-protected and protected. These networks 360, 365, 370 are coupled with EM Component 200 via secure or insecure channels 351, 350, 352, 353.

In one embodiment, access zones are implemented by EM Component 200, providing a connection to other networks 360, 365, 370 by employing a physical network interface and the necessary protocol layer implementations. The physical network interface and protocol implementations may connect to the other networks 360, 365 370 in ways that include direct connection, Ethernet, wireless, ISDN, or dialup telephone connections. In dialup telephone systems, typical protocols include TCP/IP and PPP. Wireless systems are numerous; a sample configuration includes using IEEE 802.11a, IEEE 802.11b or IEEE 802.11g and TCP/IP. The modem may be within EM Component 200 or attached in a physically sound manner to it using PCMCIA, USB or other attachment scheme.

In one embodiment, networks 360, 365, 370 communicate with Security Module 220 over channels 350, 352, 353, but in some cases unprotected network 360 communicates directly with the unprotected zone 310. External access to semi-protected zone 315 and protected zone 320 is not allowed however, and all communication with zones 315, 320 is managed by Security Module 220. A user on an external network 360, 365, 370 can only access the services 330-335 in the various zones 310, 315, 320 if they have the appropriate permissions. It will be appreciated that due to the infeasibility of including depictions of all configurations of zones and external networks, an exemplary figure is shown that indicates one of many possible configurations.

A zone may extend beyond EM Component 200 through a port to other components, but there may be a different level of security in a zone on EM Component 200 and a zone of the same name that is not on EM Component 200. This is because the two zones may be subject to different types of attacks based on the physical location, physical access or setup.

EM Component 200 may act as a gateway to other devices on a connected network such as Protected EM Network 370, by using Security Module 220 and protected zones 310, 315, 320 to manage the flow of data between the gatewayed devices and the outside world.

Unprotected Network 360 may be the Internet, an ASP, or a network of EM devices or EM components. Semi-protected EM network 365 and Protected EM network 370 may be networks of EM Devices or other EM components.

An unprotected zone 310 is essentially an area that any user can access. A semi-protected zone 315 is an area that has limited access. Only users and applications with a given security level can access this area. Another term for a semi-protected zone is a Demilitarized Zone ("DMZ"). A protected zone 320 likely has no direct link with outside components and users. However, an authorized application or user may be able to access protected zone 320 via the semi-protected zone 315. In this case a request is sent from unprotected network 360 via channel 350 to Security Module 220. Security Module 220 authorizes the request and passes it on to semi-protected zone 315 via link 341. Semi-protected zone 315 processes the request and asks for data from protected zone 320 to complete the processing. Security Module 220 authorizes the request and passes it to protected zone 320 via link 342. Protected zone 320 processes the request and returns some data to semi-protected zone 315 via links 342, 341 and Security Module 220. Semi-protected zone 315 now completes the request and forwards the response via link 341 to Security Module 220, which forwards the response on to unprotected network 360 via channel 350. Alternately, unprotected network 360 may access protected EM network 370 by making a request to semi-protected zone 315 that further requests data from protected EM network 370 to complete the request. Alternately, the Security Module 220 simply authorizes other modules to pass data to and fro, without actually transferring the data itself.

This sort of protection is particularly important when EM Component 200 is an EM Device with multiple users, where the users have different levels of authorization and different rights to access applications 330-335.

EM components located on protected network 370 may not have any inherent security mechanisms beyond the inaccessibility of their physical location. The components may be legacy devices that are difficult or expensive to retrofit with security features. As a result, their transmissions to external networks may be completely open to attack or tampering. In this case, Security module 220 can provide the necessary protection for these devices. Providing one security module to secure a whole network, rather than providing one security module per component can lower the cost of ownership of securing the network. In this case, a component on protected network 370 sends a message to Security Module 220 via channel 353. Security Module 220 provides encryption and authentication of the message and then forwards it on to unprotected network 360.

Protected EM network 370 may also request data from unprotected network 360 where Security Module 220 mediates the request.

In one embodiment, zones 310, 315, 320 are created and separated by perimeters.

In an alternate embodiment, zones 310, 315, 320 are implemented with two or more network ports on EM Component 200. This allows EM Component 200 to be connected to protected EM network 370 (perhaps corresponding to a utility customer), and unprotected network 360 (perhaps corresponding to a utility communicating over the Internet) at the same time, allowing the NAEs (i.e. utility and utility customer, for example) to contact EM Component 200 without conflict. Furthermore, certain data may only be allowed out certain ports, so NAEs don't see each other's data. The multiple ports allow EM Component 200 to connect to two (unconnected) networks simultaneously. Furthermore, where EM Component 200 has two or more network ports, EM Component 200 may act as a gateway, router, HTTP proxy server, provide network address translation, port address translation or IPv4 tunneling through IPv6 and be connected to other devices.

Perimeter Traversal

When EM Components are located behind perimeters, it can be very difficult for users or software applications to communicate with them. Various techniques for communicating with protected EM Devices are presented below.

In one embodiment, EM Component 200 is an EM Device, supporting Network News Transfer Protocol ("NNTP"). NNTP is a known protocol used to send and receive USENET postings between News clients and USENET servers. USENET is a collection of user submitted messages on various subjects posted to servers on a worldwide network and sorted by subject into newsgroups. Perimeters are usually configured to allow NNTP messages to move between the Internet and protected networks in either direction. EM Component 200 is running a software application that requires data from and may also need to send some control commands to another EM Component (not shown).

The EM Components communicate by posting to and reading USENET groups. The messages they send can be in HTML, XML, SOAP/Web Service Messages serialized in XML tagged text or in some other format. The USENET groups may be organized in many ways, including one group per EM Device, one group for a number of EM Devices, one group for all devices, or multiple groups for each individual EM Device to post into. EM Devices can also read messages posted to one or more USENET groups. Software applications can receive messages from EM Devices by reading the appropriate USENET group and send messages by posting to the correct USENET group. Access control to the USENET server may be limited by TCP/IP address to prevent unauthorized posting or reading of the server, and the sender can sign messages. Messages from unauthorized sources may not be posted. The USENET server authenticates the postings, encrypts them for the recipients who are to have access to them, and possibly signs the data in the post with its own private key in addition to whatever signature the poster may have provided, and make them available for retrieval. EM Component 200 retrieves the data, decrypts it, tests for tampering if it is signed, and processes it.

This design allows for secure distribution of commands and data to multiple EM Components. It also allows EM Components on separate protected or private networks to communicate securely with one another using an existing infrastructure. Applications for this include load control, firmware upgrade, framework upgrade and wireless paging for demand response programs. Demand response involves changing demand based on an instruction or new information, usually the price of electricity.

In an alternate embodiment, File Transfer Protocol ("FTP") rather than NNTP is employed to achieve the same goal. FTP is a known protocol used for transferring files over TCP connections using strict ownership and access restrictions. These files include text and binary files.

Where EM Component 200 is an EM Device, EM Component 200 may need to accept traffic for device configuration, retrieval of data, and control functions. For these circumstances, EM Component 200 can accept connections through a private network by participating in a VPN. EM Component 200 can provide multiple VPN client or server services. In one embodiment the Security Module 220 implements VPN functionality using IPSec. Authentication to the VPN can be done using user-ids, passwords public/private key combinations, shared secrets, certificates and so forth.

Alternately, VPN functionality is provided by a VPN device (not shown). This VPN device would be located between the Security Module 220 and a network. This VPN device would be implemented with one or more of a firewall, a VPN server or concentrator, a router or VPN capable device.

In an alternate embodiment, EM Component 200 provides a modem and PPP connection to the Internet. EM Component 200 is configured to accept traffic destined for services it exposes over the Internet and to route it to a VPN device on another network port. The VPN device provides necessary routing for the tunneled traffic. EM Component 200 also routes all VPN traffic from the VPN device through the Internet connection. EM Component 200 may require multiple network ports for the network connection, the connection to the VPN device and to participate in the VPN. One of these ports may be a telephone line. This configuration allows for both dialup access and a VPN solution in an inexpensive package.

In an alternate embodiment, EM Components send their SOAP messages to a server, server software, or embedded device ("forwarding service") on their network. This forwarding service provides encryption and authentication of the messages, and forwards them to an ASP or other recipient. The forwarding service has the ability to authenticate communications from the EM Components. The ASP can provide various services such as web reports, archival of EM data in a database, replication of EM Data from one database to another on different sides of a firewall, with the web reports being available only from the replicated database, and EM data analysis. The forwarding service may be an add-in to an email program that signs and encrypts data with S/MIME. The forwarding service may be an XML web service deployed on an embedded device or computer. Advantages of this approach include a lower cost of secure links between the EM devices and the ASP, deployability with legacy devices, and no requirement for VPN links or holes in a firewall for IPSec.

In an alternate embodiment, where EM Component 200 is protected by some kind of perimeter, messages (particularly control messages) are sent to EM Component 200 by means of email and PKI. The originator of the message may or may not be protected behind a perimeter. The originator sends an authenticatable message via a transport allowed through the perimeter, such as email, to initiate a control action. EM Component 200 attempts to authenticate the message using PKI, and if the originator is authenticated and trusted to perform the action, EM Component 200 performs the action. Advantages of this approach are that no private network access is required, it is Information Services ("IS") department friendly, and using PKI authenticatable messages provides the ability to trust certain parties with a control action, without giving them access to a private network.

In an alternate embodiment, EM Component 200 is located on a private network, protected by a perimeter. The perimeter incorporates an application gateway in a protected network. The application gateway transfers requests from the Internet to EM Component 200 and vice versa. This may be implemented using SOAP and a protocol based on Blocks Extensible Exchange Protocol ("BEEP") to implement web services on EM Devices. Alternately, the perimeter is operative to accept traffic on a port from the Internet and forwards the traffic on to the private network using a different port.

In an alternate embodiment, Internet email is used as an application gateway, and either a mailbox is created for each EM Device, or the EM Devices share a mailbox. Mailboxes are typically accessed through vendor specific protocols or by schemes including open protocols and formats like POP (various versions) or IMAP, HTTP, SOAP, XML-RPC, and HTML. The EM devices may use HTTP, NNTP or SMTP to send messages. Alternately, a Web Service gateway may access the mailbox through one of the aforementioned protocols, also allowing the EM Devices to access their mailbox through one of the aforementioned protocols. This gateway may be located on an EM Device or on a general-purpose computer. The web service gateway may invoke web service methods on EM devices using protocols (such as HTTP) and SOAP to transfer messages from mailbox to devices.

In an alternate embodiment, EM devices communicate by means of instant messaging like Jabber or Microsoft® Instant Messenger. Jabber is an open-source instant messaging protocol.

Alternately, SOAP and HTTP Rendezvous are implemented for perimeter traversal, where unsolicited messages are carried in the response to solicited messages. HTTP Rendezvous is described in pending U.S. application Ser. No. 10/340,374 "PUSH COMMUNICATIONS ARCHITECTURE FOR INTELLIGENT ELECTRONIC DEVICES" filed Jan. 9, 2003.

Virtual Roots and Virtual Hosts

Where EM Component 200 is an EM Device that implements a web server, multiple virtual roots and virtual hosts are provided on EM Component 200. Virtual roots and virtual hosts are well known in the art of web server and HTTP protocol implementation. The virtual hosts and/or virtual roots can be used to simplify configuration and user access to other gatewayed devices. For example, if EM Component 200 is acting as a gateway for EM device X (not shown), X would be addressed with an Uniform Resource Indicator ("URI") where X is the virtual host name, rather than using EM Component 200 as the host name: http://X/a/b instead of http://EMComponent200/a/b?device=X. The virtual hosts and/or virtual roots can also be used to separate XML Web Service URIs from web browsing URIs, or to separate concerns in general. For example, as Web Service URI may be at http://EMComponent200.Services/a/b/c, whereas web browsing URIs may be at http://EMComponent200/a/b/c. Separate virtual roots or virtual hosts can be processed with different priorities. For example, a virtual root or virtual host for web service requests might take precedence over a request for browsing. This allows important requests to be serviced before unimportant requests, or for requests to be queued sensibly given an understanding of service times of various types of requests, preventing queues from growing drastically. X.509 certificates are typically used for authentication of web servers using TLS or SSL in conjunction with HTTP. An interesting application is if EM Component 200 can only authenticate certain data, then only that data is made available through SSL, and the authenticable data is available on a separate virtual host that has an X.509 certificate associated with it; data EM Component 200 is not willing to vouch for can be delivered from another virtual root.

In an alternate embodiment, HTTP can be supported on more than one port instead of using the common port 80.

The aforementioned implementations allow for separation of concerns on a web meter, gatewaying of EM devices with a web meter, and secured web access for different users.

It is therefore intended that the foregoing detailed description be regarded as illustrative rather than limiting, and that it be understood that it is the following claims, including all equivalents, that are intended to define the spirit and scope of this invention.

We claim:

1. An energy management device used in an energy management architecture for managing an energy distribution system, said energy management architecture including a network, said energy management device comprising:

an energy distribution system interface configured to couple said energy management device with at least a portion of said energy distribution system;

a network interface configured to couple said energy management device with said network for transmitting outbound communications to said network, said outbound communications comprising energy management data;

a processor coupled with said network interface and said energy distribution system interface, configured to generate said energy management data;

an enclosure which surrounds said energy management device and protects said energy management device from tampering;

a tamper prevention seal coupled with said enclosure, which detects unauthorized access to said enclosure;

a seal tamper detection unit coupled with said processor and said tamper prevention seal and configured to detect when said tamper prevention seal indicates that unauthorized access has occurred; and a memory coupled with said processor, said memory configured to store confidential data, wherein said confidential data comprises a private key configured to sign said energy management data, wherein said processor is further configured to maintain said energy management data, but prevent said transmitting of said energy management data through said network interface, when said seal tamper detection unit detects that said tamper prevention seal indicates that unauthorized access has occurred.

2. The energy management device of claim 1, wherein said tamper seal comprises a revenue seal.

3. The energy management device of claim 1, wherein said tamper seal comprises a metering point id seal.

4. The energy management device of claim 1, wherein said processor is further configured to prevent access to said confidential data when said seal tamper detection unit detects that said tamper prevention seal indicates that unauthorized access has occurred.

5. The energy management device of claim 1, wherein said processor is further configured to send a message warning that said tamper prevention seal has been tampered with through said network interface when said seal tamper detection unit detects that said tamper prevention seal indicates that unauthorized access has occurred, and to sign said message with said private key.

6. The energy management device of claim 1, wherein said confidential data further comprises a certificate configured to sign said energy management data.

7. The energy management device of claim 1, wherein said processor is further configured to prevent said transmitting of signed energy management data through said network interface when said seal tamper detection unit detects that said tamper prevention seal indicates that unauthorized access has occurred.

8. The energy management device of claim 1, wherein said processor is further configured to send a message warning that said tamper prevention seal has been tampered with through said network interface when said seal tamper detection unit detects that said tamper prevention seal indicates that unauthorized access has occurred.

9. The energy management device of claim 1, wherein said processor is further configured to block external access to said energy management device when said seal tamper detection unit detects that said tamper prevention seal indicates that unauthorized access has occurred.

10. The energy management device of claim 1, wherein said processor is further configured to create an audit log when said seal tamper detection unit detects that said tamper prevention seal indicates that unauthorized access has occurred.

11. The energy management device of claim 10, wherein said processor is further configured to at least one of hashing and encrypting said audit log.

12. The energy management device of claim 1, wherein said processor is further configured to set off a security alarm when said seal tamper detection unit detects that said tamper prevention seal indicates that unauthorized access has occurred.

13. The energy management device of claim 1, further comprising a display coupled with said processor and configured to visually display text, and wherein said processor is further configured to place a warning message on said display when said seal tamper detection unit detects that said tamper prevention seal indicates that unauthorized access has occurred.

14. The energy management device of claim 1, wherein said seal tamper detection unit further comprises a sensor configured to detect that said tamper prevention seal is broken.

15. The energy management device of claim 14, wherein said sensor comprises a limit switch.

16. The energy management device of claim 14, wherein said sensor comprises a proximity sensor.

17. The energy management device of claim 16, wherein said proximity sensor comprises at least one of a pin, an optical proximity sensor, an optical motion detector, a grounding tab, an ultrasonic sensor, an electro-magnetic sensor and a gyroscope.

18. The energy management device of claim 14, wherein said sensor comprises at least one of a camera and a video camera.

19. The energy management device of claim 1, further comprising an energy storage device coupled with said seal tamper detection unit and configured to provide power to said seal tamper detection unit in power outage situations.

20. The energy management device of claim 1, wherein said processor is further configured to perform at least one energy management function on said at least a portion of said energy distribution system via said energy distribution system interface, said processor further configured to generate said energy management data as a function of said energy management function.

21. The energy management device of claim 1, further comprising: an enclosure defining an interior and an exterior and configured to enclose said energy management device within said interior and to limit access to said energy management device, and further wherein said tamper prevention seal is coupled with said enclosure and configured to deter unauthorized access to said interior of said enclosure and indicate any such access.

22. An energy management device used in an energy management architecture for managing an energy distribution system, said energy management architecture including a network, said energy management device comprising:
   an energy distribution system interface configured to couple said energy management device with at least a portion of said energy distribution system;
   a network interface configured to couple said energy management device with said network for transmitting outbound communications to said network, said outbound communications comprising energy management data;
   a processor coupled with said network interface and said energy distribution system interface, configured to generate said energy management data;
   an enclosure which surrounds said energy management device and protects said energy management device from tampering;
   a tamper prevention seal coupled with said enclosure, which detects unauthorized access to said enclosure;
   a seal tamper detection unit coupled with said processor and said tamper prevention seal and configured to detect when said tamper prevention seal indicates that unauthorized access has occurred; and
   a memory coupled with said processor, said memory configured to store confidential data, wherein said confidential data comprises a private key configured to sign said energy management data,
   wherein said processor is further configured to maintain said energy management data, but configured to mark said energy management data as unreliable, when said seal tamper detection unit detects that said tamper prevention seal indicates that unauthorized access has occurred.

23. The energy management device of claim 22, wherein said tamper seal comprises a revenue seal.

24. The energy management device of claim 22, wherein said tamper seal comprises a metering point id seal.

25. The energy management device of claim 22, wherein said processor is further configured to prevent access to said confidential data when said seal tamper detection unit detects that said tamper prevention seal indicates that unauthorized access has occurred.

26. The energy management device of claim 22, wherein said processor is further configured to send a message warning that said tamper prevention seal has been tampered with through said network interface when said seal tamper detection unit detects that said tamper prevention seal indicates that unauthorized access has occurred, and to sign said message with said private key.

27. The energy management device of claim 22, wherein said confidential data further comprises a certificate configured to sign said energy management data.

28. The energy management device of claim 22, wherein said processor is further configured to prevent said transmitting of signed energy management data through said network interface when said seal tamper detection unit detects that said tamper prevention seal indicates that unauthorized access has occurred.

29. The energy management device of claim 22, wherein said processor is further configured to send a message warning that said tamper prevention seal has been tampered with through said network interface when said seal tamper detection unit detects that said tamper prevention seal indicates that unauthorized access has occurred.

30. The energy management device of claim 22, wherein said processor is further configured to block external access to said energy management device when said seal tamper detection unit detects that said tamper prevention seal indicates that unauthorized access has occurred.

31. The energy management device of claim 22, further comprising an energy storage device coupled with said seal tamper detection unit and configured to provide power to said seal tamper detection unit in power outage situations.

32. An energy management device used in an energy management architecture for managing an energy distribution system, said energy management architecture including a network, said energy management device comprising:
    an energy distribution system interface configured to couple said energy management device with at least a portion of said energy distribution system;
    a network interface configured to couple said energy management device with said network for transmitting outbound communications to said network, said outbound communications comprising energy management data;
    a processor coupled with said network interface and said energy distribution system interface, configured to generate said energy management data;
    an enclosure which surrounds said energy management device and protects said energy management device from tampering;
    a tamper prevention seal coupled with said enclosure, which detects unauthorized access to said enclosure;
    a seal tamper detection unit coupled with said processor and said tamper prevention seal and configured to detect when said tamper prevention seal indicates that unauthorized access has occurred; and
    a memory coupled with said processor and configured to store at least one device setting, wherein information of said at least one device setting is preserved when said seal tamper detection unit detects that said tamper prevention seal indicates that unauthorized access has occurred,
    wherein said processor is further configured to appear to make a change to said at least one device setting after said seal tamper detection unit detects that said tamper prevention seal indicates that unauthorized access has occurred, but is configured to maintain a first copy of said at least one device setting as if no change was made and further operative to maintain a second copy of said at least one device setting based on a change.

33. The energy management device of claim 32, wherein said processor is further configured to prevent changes to said at least one device setting after said seal tamper detection unit detects that said tamper prevention seal indicates that unauthorized access has occurred.

34. The energy management device of claim 32, wherein said processor is further configured to permit changes to said at least one device setting, and further is configured to send a message warning that said device setting has been changed through said network interface after said seal tamper detection unit detects that said tamper prevention seal indicates that unauthorized access has occurred.

35. The energy management device of claim 32, wherein said tamper seal comprises a revenue seal.

36. The energy management device of claim 32, wherein said tamper seal comprises a metering point id seal.

37. An energy management device used in an energy management architecture for managing an energy distribution system, said energy management architecture including a network, said energy management device comprising:
    an energy distribution system interface configured to couple said energy management device with at least a portion of said energy distribution system;
    a network interface configured to couple said energy management device with said network for transmitting outbound communications to said network, said outbound communications comprising energy management data;
    a processor coupled with said network interface and said energy distribution system interface, configured to generate said energy management data;
    an enclosure which surrounds said energy management device and protects said energy management device from tampering;
    a tamper prevention seal coupled with said enclosure, which detects unauthorized access to said enclosure; and
    a seal tamper detection unit coupled with said processor and said tamper prevention seal and configured to detect when said tamper prevention seal indicates that unauthorized access has occurred,
    wherein said processor is further configured to maintain said energy management data, but prevent said transmitting of said energy management data through said network interface, when said seal tamper detection unit detects that said tamper prevention seal indicates that unauthorized access has occurred, and
    wherein said processor is further configured to prevent said transmitting of signed energy management data through said network interface when said seal tamper detection unit detects that said tamper prevention seal indicates that unauthorized access has occurred.

38. An energy management device used in an energy management architecture for managing an energy distribution system, said energy management architecture including a network, said energy management device comprising:
    an energy distribution system interface configured to couple said energy management device with at least a portion of said energy distribution system;
    a network interface configured to couple said energy management device with said network for transmitting outbound communications to said network, said outbound communications comprising energy management data;
    a processor coupled with said network interface and said energy distribution system interface, configured to generate said energy management data;

an enclosure which surrounds said energy management device and protects said energy management device from tampering;

a tamper prevention seal coupled with said enclosure, which detects unauthorized access to said enclosure; and a seal tamper detection unit coupled with said processor and said tamper prevention seal and configured to detect when said tamper prevention seal indicates that unauthorized access has occurred, wherein said processor is further configured to maintain said energy management data, but configured to mark said energy management data as unreliable, when said seal tamper detection unit detects that said tamper prevention seal indicates that unauthorized access has occurred, and wherein said processor is further configured to prevent said transmitting of signed energy management data through said network interface when said seal tamper detection unit detects that said tamper prevention seal indicates that unauthorized access has occurred.

* * * * *

UNITED STATES PATENT AND TRADEMARK OFFICE
CERTIFICATE OF CORRECTION

PATENT NO. : 7,644,290 B2
APPLICATION NO. : 10/813369
DATED : January 5, 2010
INVENTOR(S) : Ransom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Sixteenth Day of November, 2010

David J. Kappos
*Director of the United States Patent and Trademark Office*